United States Patent
Kanaya et al.

(10) Patent No.: US 10,414,915 B2
(45) Date of Patent: Sep. 17, 2019

(54) RESIN COMPOSITION, AND MOLDED ARTICLE AND PIPE FORMED FROM SAID COMPOSITION

(71) Applicant: MITSUI CHEMICALS, INC., Tokyo (JP)

(72) Inventors: Hirotaka Kanaya, Chiba (JP); Kuniaki Kawabe, Chiba (JP); Yosuke Takahashi, Ichihara (JP); Toshiyuki Ito, Sodegaura (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/765,643

(22) PCT Filed: Oct. 3, 2016

(86) PCT No.: PCT/JP2016/079368
§ 371 (c)(1),
(2) Date: Apr. 3, 2018

(87) PCT Pub. No.: WO2017/068954
PCT Pub. Date: Apr. 27, 2017

(65) Prior Publication Data
US 2019/0077949 A1 Mar. 14, 2019

(30) Foreign Application Priority Data
Oct. 19, 2015 (JP) .................. 2015-205675

(51) Int. Cl.
| C08L 21/00 | (2006.01) |
| C08L 27/06 | (2006.01) |
| C08L 23/26 | (2006.01) |
| C08L 27/24 | (2006.01) |
| C08L 51/04 | (2006.01) |
| C08K 5/01 | (2006.01) |
| C08L 23/08 | (2006.01) |

(52) U.S. Cl.
CPC .............. *C08L 27/06* (2013.01); *C08K 5/01* (2013.01); *C08L 21/00* (2013.01); *C08L 23/0815* (2013.01); *C08L 23/26* (2013.01); *C08L 27/24* (2013.01); *C08L 51/04* (2013.01); *C08L 2203/18* (2013.01)

(58) Field of Classification Search
CPC .......... C08L 21/00; C08L 23/26; C08L 27/24; C08L 51/04; C08L 23/0815; C08L 27/06; C08L 2203/18; C08K 5/01
See application file for complete search history.

(56) References Cited

U.S. PATENT DOCUMENTS

| 5,194,471 A | 3/1993 | Hartitz |
| 5,604,278 A | 2/1997 | Hartitz |
| 6,140,423 A | 10/2000 | Suzuki et al. |
| 2002/0147246 A1 | 10/2002 | Takai et al. |
| 2009/0137729 A1 | 5/2009 | Uosaki et al. |
| 2011/0272174 A1* | 11/2011 | Chaudhary ............ C08L 27/06 174/110 SR |
| 2012/0220728 A1 | 8/2012 | Uekusa et al. |
| 2017/0183491 A1* | 6/2017 | Matsumura et al. .. C08K 5/098 |
| 2017/0253716 A1* | 9/2017 | Shimamoto et al. .... C08K 3/04 |

FOREIGN PATENT DOCUMENTS

| CN | 103923420 A | 7/2014 |
| EP | 2 311 914 A1 | 4/2011 |
| JP | H05-132603 A | 5/1993 |
| JP | H06-228398 A | 8/1994 |
| JP | H07-145297 A | 6/1995 |
| JP | H07-188488 A | 7/1995 |
| JP | H08-113685 A | 5/1996 |
| JP | H08-239414 A | 9/1996 |
| JP | H08-269287 A | 10/1996 |
| JP | H11-181205 A | 7/1999 |
| JP | 2000-143879 A | 5/2000 |
| JP | 2000-204215 A | 7/2000 |
| JP | 2001-131373 A | 5/2001 |
| JP | 2002-284952 A | 10/2002 |
| JP | 2003-112357 A | 4/2003 |
| JP | 2004-059868 A | 2/2004 |

(Continued)

OTHER PUBLICATIONS

Honeywell A-C(R) Polyolefin Wax Product List and Specification, Jan. 2014.
International Search Report with English language translation and Written Opinion dated Dec. 13, 2016 in International Application No. PCT/JP2016/079368.
Chlorinated Paraffins, Chemical and Physical Data, 1990.
Extended European Search Report dated Feb. 12, 2019 in corresponding application No. 16857270.9.

*Primary Examiner* — Nathan M Nutter
(74) *Attorney, Agent, or Firm* — Foley & Lardner LLP

(57) ABSTRACT

The purpose of the present invention is to provide: a vinyl chloride resin composition having exceptional impact resistance, processability, and heat resistance. The present invention provides: a resin composition that contains 3-15 parts by mass of a rubber-based impact-absorbing material and 0.1-10 parts by mass of a modified olefin wax per 100 parts by mass of a vinyl chloride resin. This resin composition satisfies the following requirements (I)-(III). (I) The chlorine content of the vinyl chloride resin is 55-75% by mass. (II) The glass transition temperature (Tg) in differential scanning calorimetry (DSC) of the rubber-based impact-absorbing material (B) is 0° C. or lower. (III) The modified olefin wax contains at least one polar group selected from halogens and carboxylic acid derivatives, and the polar group content is within the range of 0.1-50% by mass.

11 Claims, 2 Drawing Sheets

(56) References Cited

FOREIGN PATENT DOCUMENTS

| | | | |
|---|---|---|---|
| JP | 2007-126589 | A | 5/2007 |
| JP | 2008-001840 | A | 1/2008 |
| JP | 2009-144146 | A | 7/2009 |
| JP | 2015-028187 | A | 2/2015 |
| WO | WO-2007/114102 | A1 | 10/2007 |
| WO | WO-2011/055803 | A1 | 5/2011 |

* cited by examiner

RESIN COMPOSITION, AND MOLDED ARTICLE AND PIPE FORMED FROM SAID COMPOSITION

RELATED APPLICATIONS

The present application claims priority under 37 U.S.C. § 371 to International Patent Application No. PCT/JP2016/079368, filed Oct. 3, 2016, which claims priority to and the benefit of Japanese Patent Application No. 2015-205675 filed on Oct. 19, 2015. The contents of these applications are hereby incorporated by reference in their entireties.

TECHNICAL FIELD

The present invention relates to a resin composition having a specific composition, and a molded article and a pipe containing the composition.

BACKGROUND ART

A vinyl chloride-based resin having excellent mechanical properties, processability and chemical resistance, and is inexpensive compared with other resins has been developed. This resin can therefore be used in a wide range of applications, but primarily in the field of housing as, for example, a pipe, a joint, a flat plate, a gutter, a sash, and siding. Polyvinyl chloride (PVC) is currently primarily used but has low heat resistance and is easily thermally deformed. PVC is hence limited in being used at a high temperature. Therefore, in order to improve the heat resistance of a vinyl chloride-based resin, a method for subjecting the vinyl chloride-based resin to after-chlorination is generally employed, and the resultant after-chlorinated vinyl chloride-based resin (hereinafter referred to as "chlorinated vinyl chloride-based resin") can be used as a pipe for a fire extinguishing sprinkler and a pipe for hot water supply (see PTLs 1, 2 and 4).

A chlorinated vinyl chloride-based resin has an increase in brittleness of the resin and has lower impact strength because the chlorine content therein is increased. Therefore, in order to increase the impact strength for attaining balance in mechanical properties, it is necessary to add a larger amount of an impact absorber to the chlorinated vinyl chloride-based resin composition than that to a conventional PVC. As the impact absorber, a rubber-based impact absorber having a low glass transition temperature is used. The impact strength of a chlorinated vinyl chloride-based resin is improved in proportion to the ratio of the rubber-based impact absorber in a resin composition. However, if the ratio of the rubber-based impact absorber is excessively large, the heat resistance, that is, a feature of the chlorinated vinyl chloride-based resin, is largely degraded, and its processability is also lowered. Therefore, examinations are being made for various resin compositions sufficient in all of the aspects of heat resistance, mechanical properties, and processability (see PTLs 1 to 4).

CITATION LIST

Patent Literature

PTL 1
Japanese Patent Application Laid-Open No. HEI 5-132603
PTL 2
Japanese Patent Application Laid-Open No. 2000-204215
PTL 3
Japanese Patent Application Laid-Open No. 2002-284952
PTL 4
Japanese Patent Application Laid-Open No. HEI 6-228398

SUMMARY OF INVENTION

Technical Problem

There still remains, however, a demand for a resin composition that has an increase of its heat resistance, its mechanical properties, and its processability. In particular, according to the knowledge of the present inventors, the conventional resin compositions of PTLs 1 to 4 are insufficient in impact resistance in some cases, and there is a demand for a resin composition having higher impact resistance.

In consideration of the above-described background art, an object of the present invention is to provide a vinyl chloride-based resin composition sufficient in heat resistance, impact resistance and processability, and to provide a molded article, a pipe in particular, containing the resin composition.

Solution to Problem

The present inventors made earnest studies to solve the above-described problem, and have found that the problem can be solved by using a resin composition having a specific composition, particularly, a resin composition having a specific sea-island structure, resulting in achieving the present invention.

The present invention relates to the following [1] to [10].

[1] A resin composition, including 3 to 15 parts by mass of rubber-based impact absorber (B) and 0.1 to 10 parts by mass of modified olefin wax (C) with respect to 100 parts by mass of vinyl chloride-based resin (A), and satisfying the following requirements (I) to (III):

(I) the vinyl chloride-based resin (A) has a chlorine content of 55 to 75 mass %;

(II) the rubber-based impact absorber (B) has a glass transition temperature (Tg), measured by differential scanning calorimetry (DSC), of 0° C. or less; and (III) the modified olefin wax (C) contains at least one polar group selected from a halogen and a carboxylic acid derivative, a content of the polar group being in a range of 0.1 to 50 mass %.

[2] The resin composition according to [1], in which the chlorine content in the vinyl chloride-based resin (A) is 60 to 75 mass % in the requirement (I).

[3] The resin composition according to [1] or [2], in which the rubber-based impact absorber (B) contains a rubber component selected from a butadiene rubber, an acrylic rubber and a silicone rubber.

[4] The resin composition according to any one of [1] to [3], wherein the modified olefin wax (C) is a product obtained by introducing a polar group into a homopolymer obtained from one selected from ethylene and α-olefins having 3 to 12 carbon atoms, or a copolymer obtained from two or more selected from ethylene and α-olefins having 3 to 12 carbon atoms.

[5] The resin composition according to any one of [1] to [4], in which the modified olefin wax (C) satisfies the following requirements (i) to (iv):

(i) a number average molecular weight (Mn) measured by gel permeation chromatography (GPC) in terms of polystyrene is in a range of 300 to 20,000;

(ii) a softening point measured according to JIS K2207 is in a range of 70 to 170° C.;

(iii) a density measured by a density-gradient tube method is in a range of 830 to 1,200 kg/m$^3$; and (iv) an acid value is 10 to 200 mgKOH/g.

[6] The resin composition according to any one of [1] to [5], in which the modified olefin was (C) is a carboxylic acid-modified product of an unmodified olefin wax (c), or an oxide of the unmodified olefin wax (c).

[7] The resin composition according to any one of [1] to [5], in which the modified olefin wax (C) is a maleic anhydride-modified product of an unmodified olefin wax (c).

[8] The resin composition according to any one of [1] to [7], in which a sea-island structure is observed with a transmission electron microscope (TEM) in a visual field of 16.6 μm$^2$, and the number of island phases having a particle size of 0.2 μm or more is 40 or more.

[9] The resin composition according to any one of [1] to [7], in which a sea-island structure is observed with a transmission electron microscope (TEM) in a visual field of 16.6 μm$^2$, and the number of island phases having a particle size of 0.2 μm or more and 2.0 μm or less is 40 or more.

[10] A molded article, comprising the resin composition according to any one of [1] to [9].

[11] A pipe, comprising the resin composition according to any one of [1] to [9].

Advantageous Effects of Invention

According to the present invention, a pipe excellent in balance among impact resistance, processability and heat resistance can be provided by controlling the dispersion state of a rubber-based impact absorber.

DESCRIPTION OF EMBODIMENTS

Figure 1:
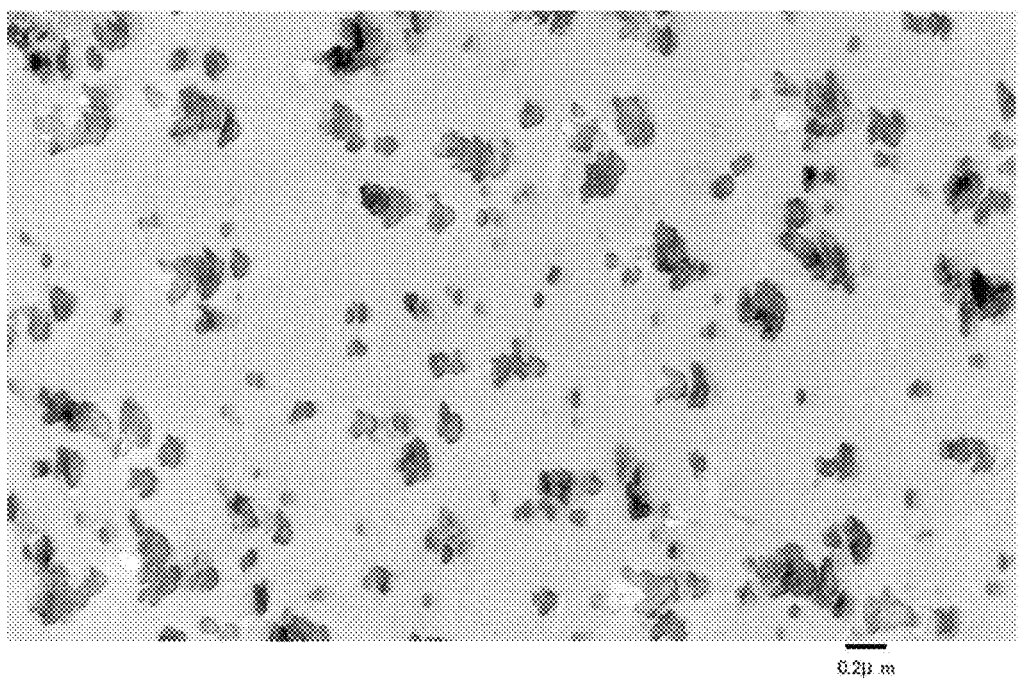
FIG. 1 illustrates observation, with a transmission electron microscope, of a resin composition of Example 1.

A resin composition of the present invention and a molded article containing the same will now be described in detail. The molded article of the present invention includes a pipe.

A. Resin Composition

The resin composition of the present invention contains vinyl chloride-based resin (A), rubber-based impact absorber (B), and modified olefin wax (C).

The amount of rubber-based impact absorber (B) is 3 to 15 parts by mass, preferably 4 to 14 parts by mass, more preferably 5 to 13 parts by mass, and particularly preferably 6 to 12 parts by mass based on 100 parts by mass of vinyl chloride-based resin (A). The amount of modified olefin wax (C) is 0.1 to 10 parts by mass, preferably 0.5 to 8 parts by mass, more preferably 1.0 to 7 parts by mass, particularly preferably 1.5 to 6 parts by mass, and further particularly preferably 1.5 to 3.5 parts by mass based on 100 parts by mass of vinyl chloride-based resin (A).

When vinyl chloride-based resin (A) and rubber-based impact absorber (B) are contained in the above-described ratio, the resin composition is excellent in balance between the impact resistance and the heat resistance. Specifically, vinyl chloride-based resin (A) is increased in a brittle aspect and is more easily broken by external force in proportion to a chlorine content therein, but is increased in a tough aspect and is more difficult to be broken by external force in proportion to the content of rubber-based impact absorber (B). Many of rubber-based impact absorbers (B) generally have an intramolecular unsaturated bond in a rubber component, and hence are easily colored through thermal degradation in proportion to the content thereof. On the contrary, when vinyl chloride-based resin (A) and rubber-based impact absorber (B) are contained in the above-described ratio, the resultant resin composition is preferably excellent in the balance between the impact resistance and the heat resistance.

When vinyl chloride-based resin (A) and modified olefin wax (C) are contained in the above-described ratio, the resultant resin composition is excellent in balance between the impact resistance and the processability. When modified olefin wax (C) is contained in a ratio equal to or more than the above-described lower limit, the resultant resin composition is excellent in impact strength. This is probably because the rubber component is dispersed in the form of a particle having a comparatively large particle size. Modified olefin wax (C) generally has, however, a lower molecular weight and lower polarity than vinyl chloride-based resin (A) and rubber-based impact absorber (B), and therefore, if modified olefin wax (C) is contained in an amount beyond the above-described upper limit value, it is expelled, in processing, to an interface between the resin composition and a screw of a molding apparatus to form a lubricating film with low viscosity on the interface, and as a result, shearing force applied to the resin composition is remarkably reduced to degrade the processability in some cases. On the contrary, when vinyl chloride-based resin (A) and modified olefin wax (C) are contained in the above-described ratio, the resultant resin composition is preferably excellent in the balance between the impact resistance and the processability.

The respective components and requirements will now be described.

1. Vinyl Chloride-Based Resin (A)

Vinyl chloride-based resin (A) has a chlorine content of 55 to 75 mass %, preferably 57 to 75 mass %, more preferably 60 to 75 mass %, and particularly preferably 63 to 75 mass %. If the chlorine content in vinyl chloride-based resin (A) is 55 mass % or more, a resin composition having sufficient heat resistance can be obtained. If the chlorine content is 75 mass % or less, a resin composition having not too high melt viscosity but good processability can be obtained. The chlorine content can be measured according to ISO 1158.

Vinyl chloride-based resin (A) has an average degree of polymerization of preferably 600 to 1,500, more preferably 600 to 1,300, and further preferably 600 to 1,200. If the average degree of polymerization of vinyl chloride-based resin (A) is 600 or more, a resin composition having more sufficient mechanical strength can be obtained. If the average degree of polymerization is 1,500 or less, a resin composition having not too high melt viscosity but good processability can be obtained. The average degree of polymerization can be measured according to JIS K6720-2.

As vinyl chloride-based resin (A), for example, not only homopolymers, such as polyvinyl chloride and polyvinylidene chloride, but also copolymers, such as a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride copolymer, a vinyl chloride-styrene-acrylonitrile copolymer, a vinyl chloride-butadiene copolymer, a vinyl chloride-vinylidene chloride-vinyl acetate copolymer, a vinyl chloride-acrylic acid ester copolymer, a vinyl chloride-maleic acid ester copolymer, a vinyl chloride-methacrylic acid ester copolymer, a vinyl chloride-acrylonitrile copolymer, and a polymer of internally plasticized polyvinyl chloride or the like, can be used. Alternatively, what is called an after-chlorinated vinyl chloride-based resin obtained through after-chlorination of any of these can be used. One of these may be singly used, or two or more of these may be used in combination. Besides, if vinyl chloride-based resin (A) is a copolymer, contents of structural units derived from respective monomers therein are not especially limited as long as the chlorine content falls in the above-described range.

2. Rubber-Based Impact Absorber (B)

Rubber-based impact absorber (B) has a glass transition temperature (Tg) measured by differential scanning calorimetry (DSC) of 0° C. or less, preferably −20° C. or less, more preferably −40° C. or less, and particularly preferably −60° C. or less. If the Tg of rubber-based impact absorber (B) is 0° C. or less, a resin composition having sufficient impact resistance can be obtained.

Rubber-based impact absorber (B) has a melt flow rate (MFR), measured according to JIS K7210-1 at a temperature of 200° C. under a load of 5 kgf, of preferably 0.1 to 70 g/10 min, more preferably 0.3 to 60 g/10 min, and further preferably 0.5 to 50 g/10 min. If the MFR of rubber-based impact absorber (B) falls in the above-described range, a resin composition having more sufficient impact resistance can be preferably obtained.

Rubber-based impact absorber (B) has a density, measured by a density-gradient tube method, of preferably 900 to 1,200 kg/m$^3$, more preferably 920 to 1,100 kg/m$^3$, and further preferably 930 to 1,050 kg/m$^3$. If the density of rubber-based impact absorber (B) falls in the above-described range, a resin composition having more sufficient impact resistance can be preferably obtained.

The Tg of rubber-based impact absorber (B) is not especially limited as long as it is 0° C. or less, and a butadiene rubber, an acrylic rubber or a silicone rubber is preferably contained as a rubber component. Besides, the rubber component preferably contains a structural unit derived from a functional group-containing olefin monomer. If rubber-based impact absorber (B) contains a structural unit derived from a functional group-containing olefin monomer, affinity between vinyl chloride-based resin (A) and the rubber component contained in rubber-based impact absorber (B) is increased, and hence, a resin composition having sufficient impact resistance can be obtained.

Examples of a functional group of the functional group-containing olefin monomer include a group containing an aromatic ring, and a group containing a group 15 to 17 element. Specific examples include an aromatic hydrocarbon group having 6 to 20 carbon atoms, a nitrile group, an ester group, a carboxyl group, a ketone group, an aldehyde group, an ether group, an amide group, an imide group, and a halogen atom, among which an aromatic hydrocarbon group having 6 to 20 carbon atoms, a nitrile group, an ester group and a carboxyl group are preferred.

As the functional group-containing olefin monomer, for example, an aromatic vinyl compound such as styrene, α-methylstyrene, para-methylstyrene, chlorostyrene, bromostyrene, dibromostyrene, tribromostyrene, vinyl naphthalene, isopropenyl naphthalene, or divinylbenzene; a cyanated vinyl compound such as (meth)acrylonitrile; an unsaturated carboxylic acid (anhydride) such as (meth) acrylic acid or maleic anhydride; and an α,β-unsaturated carboxylic acid ester such as an alkyl ester (meth)acrylate including an acrylic acid alkyl ester of methyl, ethyl, propyl or butyl can be used.

As rubber-based impact absorber (B), for example, an acrylonitrile-butadiene-styrene copolymer (ABS, Tg: −80° C.), a methyl methacrylate-butadiene-styrene copolymer (MBS, TG: −80° C.), an alkyl methacrylate-styrene copolymer (MS, Tg: −42° C.), an alkyl methacrylate-polydimethylsiloxane-styrene copolymer (Tg: −125° C.), an acrylonitrile-butadiene rubber (NBR, Tg: −85° C.), a styrene-butadiene copolymer (SBR, Tg: −80° C.), a hydrogenated styrene-butadiene-styrene copolymer (SEBS, Tg: −80° C.) or the like can be used.

3. Modified Olefin Wax (C)

Modified olefin wax (C) is not especially limited as long as it contains at least one polar group selected from a halogen and a carboxylic acid derivative, and is preferably an unsaturated carboxylic acid-modified product or an oxide of unmodified olefin wax (c), and more preferably a maleic anhydride-modified product thereof. Specific examples of the halogen include F, Cl, Br and I, among which Cl is preferred. It is noted that unmodified olefin wax (c) refers to a polymer that is obtained by polymerization or copolymerization of an α-olefin and has substantially no functional group.

Modified olefin wax (C) may contain merely one polymer, or may contain a mixture of two or more polymers.

Modified olefin wax (C) has a polar group content, obtained by elemental analysis, of preferably 0.1 to 50 mass %, more preferably 0.5 to 30 mass %, further preferably 1 to 20 mass %, particularly preferably 1.5 to 15 mass %, and further particularly preferably 2.0 to 15 mass %. If the polar group content of modified olefin wax (C) falls in the above-described range, the rubber component contained in rubber-based impact absorber (B) can be more homogeneously dispersed in the form of a particle having a comparatively large particle size, and hence, a resin composition having more sufficient impact resistance can be obtained.

Modified olefin wax (C) is preferably a product obtained by introducing the polar group into a homopolymer obtained from any one of ethylene and α-olefins having 3 to 12 carbon atoms, or a copolymer of any of these. The homopolymer or the copolymer is preferably a homopolymer or a copolymer obtained from ethylene (a polyethylene wax), or a homopolymer or a copolymer obtained from propylene (a polypropylene wax). Here, examples of the α-olefins having 3 to 12 carbon atoms include propylene having 3 carbon atoms, 1-butene having 4 carbon atoms, 1-pentene having 5 carbon atoms, 1-hexene and 4-methyl-1-pentene having 6 carbon atoms, and 1-octene having 8 carbon atoms, and propylene, 1-butene, 1-hexene, and 4-methyl-1-pentene are more preferred. The content of a structural unit derived from any one of ethylene and the α-olefins can be set to, for example, a range described below with respect to a polyethylene wax or a polypropylene. The content of the structural unit can be obtained by analysis of a $^{13}$C-NMR spectrum.

Besides, unmodified olefin wax (c) may be one obtained by thermally decomposing a 4-methyl-1-pentene/α-olefin copolymer disclosed in WO2011/055803, or a 4-methyl-1-pentene-based polymer described in Japanese Patent Application Laid-Open No. 2015-028187.

Modified olefin wax (C) has a number average molecular weight (Mn), measured by gel permeation chromatography (GPC) in terms of polystyrene, of preferably 300 to 20,000.

An upper limit of the number average molecular weight (Mn) is preferably 18,000, more preferably 10,000, further preferably 9,000, and particularly preferably 5,000. Besides, a lower limit of the number average molecular weight (Mn) is preferably 500, more preferably 1,000, and further preferably 1,300. If the number average molecular weight falls in the above-described range, the rubber component contained in rubber-based impact absorber (B) can be more homogeneously dispersed in the form of a particle having a comparatively large particle size, and hence, a resin composition having more sufficient impact resistance can be obtained. Besides, the processability and kneading property of the resin composition can be good.

Modified olefin wax (C) has a softening point, measured according to JIS K2207, of preferably 70 to 170° C., more preferably 80 to 160° C., further preferably 90° C. to 150° C., and particularly preferably 95° C. to 150° C. If the softening point falls in the above-described range, the resultant resin component is more excellent in the processability.

Modified olefin wax (C) has a density, measured by a density-gradient tube method, of preferably 830 to 1,200 kg/m$^3$, more preferably 860 to 1,100 kg/m$^3$, further preferably 890 to 1,000 kg/m$^3$, particularly preferably 895 to 960 kg/m$^3$, and further particularly preferably 895 to 935 kg/m$^3$. If the density falls in the above-described range, the rubber component contained in rubber-based impact absorber (B) can be more homogeneously dispersed in the form of a particle having a comparatively large particle size, and a resin composition having more sufficient impact resistance can be preferably obtained.

(Polyethylene Wax)

If unmodified olefin wax (c) is a polyethylene wax, for example, a polyethylene wax described in Japanese Patent Application Laid-Open No. 2009-144146 or the like is preferably used. Particularly preferable examples of the polyethylene wax will now be simply described.

The polyethylene wax is preferably an ethylene homopolymer, or a copolymer, mainly containing ethylene, of ethylene and an α-olefin having 3 to 12 carbon atoms.

Specific examples of the ethylene homopolymer include a high density polyethylene wax, a middle density polyethylene wax, a low density polyethylene wax, and a linear low density polyethylene wax.

Meanwhile, in the copolymer of ethylene and an α-olefin having 3 to 12 carbon atoms, the amount of a structural unit derived from ethylene is preferably 91.0 to 99.9 mol %, more preferably 93.0 to 99.9 mol %, further preferably 95.0 to 99.9 mol %, and particularly preferably 95.0 to 99.0 mol %, and the amount of a structural unit derived from an α-olefin having 3 or more carbon atoms is preferably 0.1 to 9.0 mol %, preferably 0.1 to 7.0 mol %, further preferably 0.1 to 5.0 mol %, and particularly preferably 1.0 to 5.0 mol %. Besides, a total amount of the structural unit derived from ethylene and the structural unit derived from an α-olefin having 3 to 12 carbon atoms is preferably 100 mol %. Although this does not mean that a structural unit except for ethylene and an α-olefin having 3 to 12 carbon atoms should not be contained, the amount of a structural unit except for these is preferably 5 mol % or less. The contents of these structural units can be obtained by the analysis of a $^{13}$C-NMR spectrum.

Here, examples of the α-olefin having 3 to 12 carbon atoms include propylene having 3 carbon atoms, 1-butene having 4 carbon atoms, 1-pentene having 5 carbon atoms, 1-hexene and 4-methyl-1-petene having 6 carbon atoms, and 1-octene having 8 carbon atoms. Among these, when propylene or 1-butene is copolymerized, resultant modified olefin wax (C) tends to be hard and less solid, and hence, the surface property of a resultant molded article becomes good. Besides, the mechanical strength and the heat resistance can be preferably increased. Although the reason why modified olefin wax (C) is thus hard and less solid is not clear, propylene or 1-butene efficiently lowers the melting point through a smaller amount of copolymerization as compared with other α-olefins, and hence tends to have a higher degree of crystallinity when compared at the same melting point, and this is presumed as the factor. One of these α-olefins may be used singly, or two or more of these may be used in combination.

(Polypropylene Wax)

The polypropylene wax may be a propylene homopolymer, a polymer of propylene and ethylene, or a copolymer, principally containing propylene, of propylene and an α-olefin having 4 to 12 carbon atoms.

If the polypropylene wax is a copolymer of propylene and ethylene, it contains a structural unit derived from propylene in an amount of preferably 60 to 99.5 mol %, more preferably 80 to 99 mol %, further preferably 90 to 98.5 mol %, and particularly preferably 95 to 98 mol %, and contains a structural unit derived from ethylene in an amount of preferably 0.5 to 40 mol %, more preferably 1.0 to 20 mol %, further preferably 1.5 to 10 mol %, and particularly preferably 2.0 to 5.0 mol %. Besides, a total amount of the structural unit derived from propylene and the structural unit derived from ethylene is preferably 100 mol %. Although this does not mean that a structural unit except for propylene and ethylene should not be contained, the amount of a structural unit except for these is preferably 5 mol % or less. When such a polypropylene wax is used, a resin composition excellent in balance among the appearance, the mechanical strength and the heat resistance can be obtained. The contents of these structural units can be obtained by the analysis of a $^{13}$C-NMR spectrum.

If the polypropylene wax is a copolymer of propylene and an α-olefin having 4 to 12 carbon atoms, examples of the α-olefin having 4 to 12 carbon atoms include linear or branched α-olefins having 4 to 12 carbon atoms, such as 1-butene, 1-pentene, 3-methyl-1-butene, 1-hexene, 4-methyl-1-pentene, 3-methyl-1-pentene, 1-octene, 1-decene, and 1-dodecene. Among these, 1-butene is particularly preferred.

If the polypropylene wax is a propylene/α-olefin copolymer, the amount of a structural unit derived from propylene is preferably 60 to 90 mol %, more preferably 65 to 88 mol %, further preferably 70 to 85 mol %, and particularly preferably 75 to 82 mol %, whereas the amount of a structural unit derived from an α-olefin having 4 or more carbon atoms is preferably 10 to 40 mol %, more preferably 12 to 35 mol %, further preferably 15 to 30 mol %, and particularly preferably 18 to 25 mol %. Besides, a total amount of the structural unit derived from propylene and the structural unit derived from an α-olefin having 3 to 12 carbon atoms is preferably 100 mol %. Although this does not mean that a structural unit except for propylene and an α-olefin having 3 to 12 carbon atoms should not be contained, the amount of a structural unit except for these is preferably 5 mol % or less.

When a polymer of propylene and ethylene or a copolymer, containing principally propylene, of propylene and an α-olefin having 4 to 12 carbon atoms, having the above-described composition is used, a resin composition having an excellent appearance can be obtained. This is probably because it takes time to crystallize modified olefin wax (C), and hence a time when the resin can flow on a mold or during a cooling step can be long, resulting in attaining a good surface property. Besides, the heat resistance and the mechanical strength tend to be excellent.

(Production Method for Unmodified Olefin Wax (c))

Unmodified olefin wax (c) may be one obtained by directly polymerizing ethylene or an α-olefin used as a material, or one obtained by thermally decomposing a copolymer having a high molecular weight. If the thermal decomposition is employed, the thermal decomposition is performed preferably at 300 to 450° C. for 5 minutes to 10 hours.

When a copolymer having a high molecular weight is thermally decomposed, resultant unmodified olefin wax (c) has an unsaturated end. Here, if the number of vinylidene groups per 1,000 carbon atoms, measured by $^1$H-NMR, is 0.5 to 5, a compatibilizing effect for vinyl chloride-based resin (A) can be preferably increased.

Besides, unmodified olefin wax (c) may be purified by a method of solvent separation in which a difference in solubility in a solvent is used for separation, or distillation or the like.

If ethylene or an α-olefin is directly polymerized to obtain unmodified olefin wax (c), unmodified olefin wax (c) can be produced by various known production methods, such as a method in which ethylene or an α-olefin is polymerized using a Ziegler/Natta catalyst or a metallocene-based catalyst.

As a method for the polymerization, it is possible to employ a suspension polymerization method in which polymerization is performed in a state where a monomer to be polymerized and unmodified olefin wax (c) having been polymerized are present in the form of a particle in an inert hydrocarbon medium such as hexane, a gas phase polymerization method in which polymerization is performed without using a solvent, or a solution polymerization method in which polymerization is performed in a state where a monomer to be polymerized and unmodified olefin wax (c) having been polymerized are melted in coexistence with an inert hydrocarbon medium or singly, and among these methods, the solution polymerization is preferably employed from the viewpoints of both economic efficiency and product quality. A polymerization reaction may be performed either by a batch method or a continuous method. The polymerization can be performed in two or more stages respectively employing different reaction conditions.

Examples of the inert hydrocarbon medium used in the suspension polymerization method and the solution polymerization method include aliphatic hydrocarbons such as propane, butane, pentane, hexane, heptane, octane, decane, dodecane and kerosene; alicyclic hydrocarbons such as cyclopentane, cyclohexane, and methyl cyclopentane; aromatic hydrocarbons such as benzene, toluene, and xylene; and halogenated hydrocarbons such as ethylene chloride, chlorobenzene, and dichloromethane. One of these inert hydrocarbon media may be singly used, or a mixture of two or more of these may be used. Alternatively, what is called a bulk polymerization method in which a liquefied α-olefin itself that can be supplied for the polymerization is used as a solvent can be employed.

As the catalyst, a metallocene-based catalyst is preferably used. As the metallocene-based catalyst, a catalyst containing for example, (i) a metallocene compound of a transition metal selected from the group 4 elements of the periodic table, and (ii) at least one compound selected from the following (ii-1) to (ii-3): (ii-1) an organic aluminum oxy compound, (ii-2) a compound forming an ion pair through reaction with metallocene compound (i) (hereinafter referred to as an "ionized ionic compound" in some cases), and (ii-3) an organic aluminum compound can be suitably used (see Japanese Patent Application Laid-Open No. HEI 08-239414 and WO2007/114102).

Examples of metallocene compound (i) of a transition metal selected from the group 4 elements of the periodic table include metallocene compounds described in Japanese Patent Application Laid-Open No. HEI 08-239414 and WO2007/114102, and in particular, bis(n-butylcyclopentadienyl)zirconium dichloride, and bis(n-butylcyclopentadienyl)zirconium dimethyl are particularly suitably used.

As organic aluminum oxy compound (ii-1), conventionally known aluminoxane can be directly used. Examples include organic aluminum oxy compounds described in Japanese Patent Application Laid-Open No. HEI 08-239414 and WO2007/114102. As organic aluminum oxy compound (ii-1), methyl aluminoxane or modified methylaluminoxane (MMAO) prepared by using trimethylaluminum and triisobutylaluminum are preferably used because these are commercially available products and can be easily obtained.

Examples of ionized ionic compound (ii-2) include ionized ionic compounds described in Japanese Patent Application Laid-Open No. HEI 08-239414 and WO2007/114102. As ionized ionic compound (ii-2), triphenylcarbenium tetrakis(pentafluorophenyl)borate and N,N-dimethylanilinium tetrakis(pentafluorophenyl)borate are preferred because these are easily available as commercially available products and can largely contribute to improvement of polymerization activity.

An example of organic aluminum compound (ii-3) includes an organic aluminum compound described in WO2007/114102. As organic aluminum compound (ii-3), trimethylaluminum, triethylaluminum and triisobutylaluminum, which are commercially available products and hence can be easily obtained, are preferred. Among these, triisobutylaluminum is particularly preferred because it is easily handled.

As at least one compound (ii) selected from compounds (ii-1) to (ii-3), a combination of triisobutylaluminum and triphenylcarbenium tetrakis(pentafluorophenyl)borate, and a combination of triisobutylaluminum and N,N-dimethylanilinium tetrakis(pentafluorophenyl)borate are particularly preferred because polymerization activity is largely improved when these are used.

In performing the polymerization of a monomer using the above-described metallocene-based catalyst for the olefin polymerization, contents of the respective components can be set as follows.

(1) Metallocene compound (i) can be used in an amount corresponding to $10^{-9}$ to $10^{-1}$ mole, and preferably $10^{-8}$ to $10^{-2}$ mole per liter of a reaction volume.

(2) If a catalyst containing metallocene compound (i) and organic aluminum oxy compound (ii-1) as components of the catalyst for the olefin polymerization is used, compound (ii-1) can be used in an amount corresponding to a molar ratio [Al/M] between an aluminum atom (Al) in compound (ii-1) and all transition metal atoms (M) in metallocene compound (i) of 0.01 to 5,000, and preferably 0.05 to 2,000.

(3) If a catalyst containing metallocene compound (i) and ionized ionic compound (ii-2) as components of the catalyst for the olefin polymerization is used, compound (ii-2) can be used in an amount corresponding to a molar ratio [(ii-2)/M] between compound (ii-2) and all transition metal atoms (M) in metallocene compound (i) of 1 to 10, and preferably 1 to 5.

(4) If a catalyst containing metallocene compound (i) and organic aluminum compound (ii-3) as components of the catalyst for the olefin polymerization is used, compound (ii-3) can be used in an amount corresponding to a molar ratio [(ii-3)/M] between compound (ii-3) and all transition metal atoms (M) in metallocene compound (i) of usually 0.01 to 50,000, and preferably 0.05 to 10,000.

Besides, a polymerization temperature is usually 10 to 200° C., and from the viewpoint of producing unmodified olefin wax (c) having the above-described suitable amounts of the structural units, the polymerization temperature is preferably in a range of 60 to 180° C., and more preferably in a range of 75 to 170° C. A polymerization pressure can be normal pressure to 7.8 MPa-G (wherein G is a gauge pressure), and preferably normal pressure to 4.9 MPa-G (wherein G is a gauge pressure).

In the polymerization, ethylene and an α-olefin are supplied to a polymerization system in an amount ratio with which unmodified olefin wax (c) having the above-described specific composition can be obtained. Besides, in the polymerization, a molecular weight adjuster such as hydrogen can be added.

When the polymerization is thus performed, a resultant polymer is usually obtained in the form of a polymerization solution containing the same, and hence, unmodified olefin wax (c) can be obtained by processing the polymerization solution by a usual method.

Besides, the polymer obtained by the above-described method can be further purified by, for example, a method for performing deaeration under vacuum at a temperature equal to or lower than the melting point, a method in which the polymer is dissolved once in a solvent such as toluene, xylene, hexane or heptane, a polar solvent such as methanol or acetone is added thereto, and the resultant is filtered for removing a low molecular weight portion, or a method in which the polymer is totally dissolved in a solvent, and is then precipitated at a specific temperature for removing a high molecular weight portion or a low molecular weight portion.

A number average molecular weight (Mn) and a limiting viscosity [η] of unmodified olefin wax (c) tend to be lowered when the polymerization temperature employed for the polymerization is increased or a hydrogen concentration is increased, and thus can be controlled to fall in the above-described ranges. Alternatively, these can be adjusted in accordance with a use amount of the organic aluminum oxy compound and/or the ionized ionic compound used as a co-catalyst. Alternatively, they can be adjusted by performing purification after the polymerization.

The content of the unit derived from ethylene or each α-olefin can be controlled by adjusting a blending amount in the polymerization as well as in accordance with catalyst species and the polymerization temperature.

The Mw/Mn of unmodified olefin wax (c) can be controlled in accordance with the catalyst species and the polymerization temperature. In general, a Ziegler/Natta catalyst or a metallocene catalyst is used for the polymerization, and a metallocene catalyst is preferably used for attaining the Mw/Mn falling in a suitable range. Besides, the suitable range can be obtained by performing purification by the method of the solvent separation in which a difference in solubility in a solvent is used for separation, or the distillation or the like.

A softening point of unmodified olefin wax (c) can be adjusted in accordance with the compositions of ethylene and the α-olefin, and for example, a copolymer of ethylene and the α-olefin tends to have a lower softening point when the content of the α-olefin is larger. Alternatively, the softening point can be controlled in accordance with the catalyst species and the polymerization temperature. Further alternatively, it can be adjusted by performing the purification after the polymerization.

A density of unmodified olefin wax (c) can be adjusted in accordance with the compositions of ethylene and the α-olefin, and the polymerization temperature and the hydrogen concentration employed in the polymerization.

(Production Method for Modified Olefin Wax (C))

Modified olefin wax (C) can be obtained by introducing, into unmodified olefin wax (c), at least one selected from a halogen and a carboxylic acid derivative as a polar group. Specifically, examples of the production method include the following.

<Halogen Modification>

A modified olefin wax into which a halogen is introduced as a polar group can be prepared by a known method. Examples of the known method include a method in which chloride is supplied, as a halogen, to unmodified olefin wax (c) having been melted, dissolved in an organic solvent such as carbon tetrachloride, or aqueously suspended, and the resultant is chlorinated by irradiation with a mercury lamp, a method in which the chlorination is performed in the presence of a polymerization initiator such as an organic peroxide, and a method in which the chlorination is performed by irradiation with a mercury lamp under a flow of a chlorine gas. Halogen-modified olefin wax (C) used in the present invention may be one obtained by any of the methods, and one obtained by the chlorination of unmodified olefin wax (c) in a melted state is preferred because production efficiency is high and unmodified olefin wax (c) can be thus homogeneously chlorinated.

<Unsaturated Carboxylic Acid Modification>

Modified olefin wax (C) into which an unsaturated carboxylic acid or a derivative thereof is introduced as a polar group can be prepared by a known method. Such a modified olefin wax is obtained, for example, by melt kneading unmodified olefin wax (c) and an unsaturated carboxylic acid or a derivative thereof in the presence of a polymerization initiator such as an organic peroxide, or by dissolving unmodified olefin wax (c) and an unsaturated carboxylic acid or a derivative thereof in an organic solvent, and kneading the resultant solution in the presence of a polymerization initiator such as an organic peroxide.

For the melt kneading, for example, an autoclave, a Henschel mixer, a V-blender, a tumbler blender, a ribbon blender, a single screw extruder, a multi-screw extruder, a kneader, a banbury mixer or the like is used. When an apparatus, among these, excellent in batch melt kneading performance, such as an autoclave, is used, a modified olefin wax in which the respective components are more homogeneously dispersed/reacted can be obtained. As compared with a continuous method, in employing the batch method, a retention time can be easily adjusted, and a modification rate and modification efficiency can be comparatively easily increased because the retention time can be long, and therefore, the batch method is employed in the most preferable aspect of the present invention.

Examples of an unsaturated carboxylic acid or a derivative thereof used in graft modification include acrylic acid esters such as methyl acrylate, ethyl acrylate, butyl acrylate, sec-butyl acrylate, isobutyl acrylate, propyl acrylate, isopropyl acrylate, 2-octyl acrylate, dodecyl acrylate, stearyl acrylate, hexyl acrylate, isohexyl acrylate, phenyl acrylate, 2-chlorophenyl acrylate, diethylaminoethyl acrylate, 3-methoxybutyl acrylate, diethyleneglycol ethoxyl acrylate, and 2,2,2-trifluoroethyl acrylate; methacrylic acid esters such as methyl methacrylate, ethyl methacrylate, butyl methacrylate, sec-butyl methacrylate, isobutyl methacrylate, propyl methacrylate, isopropyl methacrylate, 2-octyl methacrylate, dodecyl methacrylate, stearyl methacrylate, stearyl methacrylate, hexyl methacrylate, decyl methacrylate, phenyl methacrylate, 2-chlorohexyl methacrylate, diethylaminoethyl methacrylate, 2-hexylethyl methacrylate, and 2,2,2-trifluoroethyl methacrylate; maleic acid esters such as ethyl maleate, propyl maleate, butyl maleate, diethyl maleate, dipropyl maleate, and dibutyl maleate; fumaric acid esters such as ethyl fumarate, butyl fumarate, and dibutyl fumarate; dicarboxylic acids such as maleic acid, fumaric acid, itaconic acid, crotonic acid, nadic acid, and methylhexahydrophthalic acid; and anhydrides such as maleic anhydride, itaconic anhydride, citraconic anhydride, allyl succinic anhydride, glutaconic anhydride, and nadic anhydride. Among these, maleic anhydride is preferably used.

Acid-modified olefin wax (C) thus obtained has an acid value (JIS K5902) of preferably 10 to 200 mgKOH/g, preferably 15 to 150 mgKOH/g, more preferably 20 to 120 mgKOH/g, particular preferably 30 to 100 mgKOH/g, and further particularly preferably 30 to 80 mgKOH/g. Here, an acid value refers to the number of milligrams of potassium hydroxide necessary for neutralizing 1 g of a sample.

If the acid value of an acid-modified polyolefin wax falls in the above-described range, the impact resistance and the processability are particularly excellent. The reason is probably because balance in the compatibilizing effect between rubber-based impact absorber (B) and vinyl chloride-based resin (A) is excellent.

Acid-modified olefin wax (C) may be a commercially available product. Examples of a commercially available acid-modified polyolefin wax include DIACARNA (trade name) PA30 (Mitsubishi Chemical Corporation), Hi-wax acid-treated type NP0555A, 2203A and 1105A (Mitsui Chemicals Inc.), and oxidized paraffin (Nippon Seiro Co., Ltd.).

<Oxidative Modification>

A modified olefin wax having been oxidatively modified is obtained by bringing unmodified olefin wax (c) in a melted state into contact with oxygen or an oxygen-containing gas under stirring. Unmodified olefin wax (c) is placed in a melted state generally at 130 to 200° C., and preferably at 140 to 170° C.

For the oxidative modification, an oxidation reaction is performed by bringing unmodified olefin wax (c) in a melted state into contact with oxygen or an oxygen-containing gas under stirring, and the term "oxygen or an oxygen-containing gas" inclusively refers to pure oxygen (oxygen obtained by usual liquid air distillation or electrolysis of water, and allowably containing another component in an amount corresponding to an impurity), a mixed gas of pure oxygen and another gas, such as air and ozone.

As a method for bringing unmodified olefin wax (c) into contact with oxygen or the like, specifically, a method in which an oxygen-containing gas is continuously supplied from a lower portion of a reactor to be brought into contact with a raw material polyolefin wax is preferably employed. Besides, in this case, the oxygen-containing gas is preferably supplied to attain an oxygen amount corresponding to 1.0 to 8.0 NL per minute per kg of a raw material mixture.

The modified olefin wax having been oxidatively modified in this manner has an acid value (JIS K5902) of preferably 10 to 200 mgKOH/g, preferably 15 to 150 mgKOH/g, more preferably 20 to 120 mgKOH/g, particularly preferably 30 to 100 mgKOH/g, and further particularly preferably 30 to 80 mgKOH/g. Here, an acid value refers to the number of milligrams of potassium hydroxide necessary for neutralizing 1 g of a sample.

4. Other Additives

The resin composition of the present invention may contain, as other additives, additives known in the field of vinyl chloride-based resins, and examples include a nucleating agent, an anti-blocking agent, fiber, a filling agent, a filler, a pigment, a dye, a lubricant, a plasticizer, a releasing agent, an antioxidant, a flame retardant, a UV absorber, an antibacterial agent, a surfactant, an antistatic agent, a weathering stabilizer, a heat stabilizer, an anti-slipping agent, a foaming agent, a crystallization auxiliary agent, an anti-fogging agent, an anti-aging agent, a hydrochloric acid absorber, an impact modifier, a crosslinking agent, a co-crosslinking agent, a crosslinking auxiliary agent, an adhesive, a softening agent, and a processing auxiliary agent.

One of these additives may be used singly, or two or more of these may be used in combination. The content of such an additive is not especially limited but may be set in accordance with application unless the object of the present invention is impaired, and the content of each additive to be blended is preferably about 0.05 to 70 parts by mass with respect to 100 parts by mass of vinyl chloride-based resin (A). The upper limit of the content is more preferably 30 parts by mass.

Examples of the fiber include glass fiber, carbon fiber, natural fiber (such as wood flour, wood fiber, bamboo, cotton, cellulose, and nano-cellulose fiber), and agricultural product fiber (such as straw, hemp, flax, kenaf, kapok, jute, rumie, sisal hemp, henequen, corn fiber or coir, and nut shell or chaff). Examples of the filling agent include lignin, starch, and a product containing any of these.

The type of the glass fiber is not especially limited, and roving glass, chopped strand glass, milled glass and the like can be used. Besides, one of these may be used or a mixture of two or more of these may be used.

The carbon fiber is not especially limited in the shape or the type, examples of the shape include shapes of a chopped strand, a roving strand, and milled fiber, and any type of pitch-based and polyacrylonitrile-based ones may be used. One obtained by spinning or molding such a raw material composition and carbonizing the resultant as well as carbon fiber obtained without basically performing a spinning step, for example, by vapor deposition can be used.

As the filler, amorphous fillers such as calcium carbonate, silica, kaolin, clay, titanium oxide, barium sulfate, zinc oxide, aluminum hydroxide, alumina, and magnesium hydroxide, plate-shaped fillers such as talc, mica, and glass flake, needle-shaped fillers such as wollastonite, potassium titanate, basic magnesium sulfate, sepiolite, xonotlite, and aluminum borate, and fillers of metal powders, metal flakes, carbon black and carbon fine particles are used. In addition, a glass bead, a glass powder and the like are used. One of these filers may be singly used, a plurality of these may be used in combination, or one of or a combination of a plurality of these having been subjected to carbon coating or silane coupling treatment may be used.

Examples of the pigment include an inorganic pigment (such as titanium oxide, iron oxide, chromium oxide, or cadmium sulfate), and an organic pigment (such as azo lake, thioindigo, phthalocyanine, or anthraquinone pigment). Examples of the dye include azo, anthraquinone, and triphenylmethane dyes. An addition amount of such a pigment or dye is not especially limited, and is usually 5 parts by mass or less, and preferably 0.1 to 3 parts by mass in total with respect to 100 parts by mass of vinyl chloride-based resin (A).

Examples of the lubricant include waxes except for modified olefin wax (C) (such as unmodified polyethylene wax, unmodified polypropylene wax, vaseline, tall oil, castor oil, rapeseed oil, soybean oil, palm oil, beeswax, paraffin wax, liquid paraffin, carnauba wax, montanic acid wax, and microcrystalline wax), a higher fatty acid (such as stearic acid) and a metal salt thereof (such as zinc stearate or calcium stearate), a higher alcohol (such as stearyl alcohol) and an ester thereof (such as butyl stearate), a higher fatty acid amide (such as stearic acid amide), a process oil, and various lubricants. As a lubricant, for example, Mitsui Hi Wax (manufactured by Mitsui Chemicals Inc.) is used. The lubricant is used in a ratio of preferably 0.05 to 10 parts by mass with respect to 100 parts by mass of vinyl chloride-based resin (A).

Examples of the plasticizer include an aromatic carboxylic acid ester (such as dibutyl phthalate), an aliphatic carboxylic acid ester (such as methyl acetyl ricinoleate), an aliphatic dicarboxylic acid ester (such as adipic acid-propylene glycol-based polyester), an aliphatic tricarboxylic acid ester (such as triethyl citrate), a phosphoric acid triester (such as triphenyl phosphate), an epoxy fatty acid ester (such as epoxy butyl stearate), and a petroleum resin.

As the antioxidant, a known antioxidant can be used. Specific examples include phenol-based (such as 2,6-di-t-butyl-4-methylphenol), polycyclic phenol-based (such as 2,2'-methylenebis(4-methyl-6-t-butylphenol), phosphorus-based (such as tetrakis(2,4-di-t-butylphenyl)-4,4-biphenylene diphosphonate), sulfur-based (such as dilauryl thiodipropionate), amine-based (such as N,N-diisopropyl-p-phenylenediamine), and lactone-based antioxidants.

Examples of the flame retardant include an organic flame retardant (such as nitrogen-containing, sulfur-containing, silicon-containing or phosphorus-containing flame retardant), and an inorganic flame retardant (such as antimony trioxide, magnesium hydroxide, zinc borate, or red phosphorus).

Examples of the UV absorber include benzotriazole-based, benzophenone-based, salicylic acid-based, and acrylate-based UV absorbers.

Examples of the antibacterial agent include a quaternary ammonium salt, a pyridine-based compound, an organic acid, an organic acid ester, halogenated phenol, and organic iodine.

Examples of the surfactant include nonionic, anionic, cationic, and amphoteric surfactants. Examples of the nonionic surfactant include a polyethylene glycol type nonionic surfactant such as a higher alcohol ethylene oxide adduct, a fatty acid ethylene oxide adduct, a higher alkylamine ethylene oxide adduct, or a polypropylene glycol ethylene oxide adduct, and a polyhydric alcohol type nonionic surfactant such as polyethylene oxide, a fatty acid ester of glycerin, a fatty acid ester of pentaerythritol, a fatty acid ester of sorbit or sorbitan, an alkyl ether of a polyhydric alcohol, or an aliphatic amide of alkanolamine. Examples of the anionic surfactant include a sulfuric acid ester such as an alkali metal salt of a higher fatty acid, a sulfonic acid salt such as an alkylbenzene sulfonic acid salt, an alkyl sulfonic acid salt, or a paraffin sulfonic acid salt, and a phosphoric acid ester salt such as a higher alcohol phosphoric acid ester salt. An example of the cationic surfactant includes a quaternary ammonium salt such as an alkyl trimethyl ammonium salt. Examples of the amphoteric surfactant include an amino acid type amphoteric surfactant such as a higher alkyl aminopropionic acid salt, and a betaine type amphoteric surfactant such as higher alkyl dimethyl betaine, or a higher alkyl dihydroxyethyl betaine.

Examples of the antistatic agent include the above-described surfactants, a fatty acid ester, and a polymer type antistatic agent. An example of the polymer type antistatic agent includes a polyether-ester amide.

As the crosslinking agent, for example, an organic peroxide is used. Examples of the organic peroxide include dicumyl organic peroxide, di-tert-butyl organic peroxide, 2,5-dimethyl-2,5-di-(tert-butylperoxy)hexane, 2,5-dimethyl-2,5-di(tert-butylperoxy)hexyne-3,1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl organic peroxide, p-chlorobenzoyl peroxide, 2,4-dichlorobenzoyl organic peroxide, tert-butyl peroxybenzoate, tert-butyl perbenzoate, tert-butylperoxy isopropyl carbonate, diacetyl organic peroxide, lauroyl organic peroxide, and tert-butyl cumyl organic peroxide.

Among these, from the viewpoint of odor and scorch stability, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, and n-butyl-4,4-bis(tert-butylperoxy)valerate are more suitably used, and 1,3-bis(tert-butylperoxyisopropyl)benzene is further suitably used.

The organic peroxide is used in a ratio of preferably 0.05 to 10 parts by mass with respect to 100 parts by mass of vinyl chloride-based resin (A).

In performing a crosslinking treatment with the organic peroxide, a peroxy crosslinking auxiliary agent such as sulfur, p-quinone dioxime, p,p'-dibenzoylquinone dioxime, N-methyl-N-4-dinitrosoaniline, nitrosobenzene, diphenyl guanine, or trimethylolpropane-N,N'-m-phenylenedimaleimide; a polyfunctional methacrylate monomer such as divinyl benzene, triallyl cyanurate, ethylene glycol dimethacrylate, diethylene glycol dimethacrylate, polyethylene glycol dimethacrylate, trimethylolpropane trimethacrylate, or allyl methacrylate; or a polyfunctional vinyl monomer such as vinyl butyrate, or vinyl stearate can be blended as the crosslinking auxiliary agent.

When any of the above-described compounds is used, a homogeneous and mild crosslinking reaction can be expected to be performed. In particular, in the present invention, divinyl benzene is suitably used. Divinyl benzene is easy to handle, has good compatibility with a polymer, has an effect to solubilize the organic peroxide, and works as a dispersant for the organic peroxide. Therefore, a homogeneous crosslinking effect can be obtained, and a dynamic heat treated product well balanced in flowability and physical properties can be obtained. The crosslinking auxiliary agent is used in a ratio of preferably 0.05 to 10 parts by mass with respect to 100 parts by mass of vinyl chloride-based resin (A).

Examples of the softening agent include a coal tar-based softening agent such as coal tar or coal tar pitch, a synthetic polymeric substance such as atactic polypropylene, an ester-based plasticizer such as dioctyl phthalate, dioctyl adipate or dioctyl sebacate, and a carbonic acid ester-based plasticizer such as diisododecyl carbonate.

The amount of the softening agent is not especially limited, and is preferably an amount corresponding to 1 to 200 parts by mass with respect to 100 parts by mass of vinyl chloride-based resin (A). The softening agent makes processing easy in preparing the resin composition as well as aids dispersion of carbon black or the like.

5. Physical Properties, Etc.

The resin composition of the present invention has a melt flow rate (MFR), measured according to JIS K7210-1 at a temperature of 200° C. under a testing load of 5 kgf, of preferably 0.01 to 100 g/10 min, more preferably 0.1 to 50 g/10 min, further preferably 0.5 to 30 g/10 min, particularly preferably 1 to 20 g/10 min, and further particularly preferably 3 to 15 g/10 min. If the MFR of the resin composition falls in the above-described range, the resin composition is excellent in balance among the impact resistance, the processability and the heat resistance.

In the resin composition of the present invention, a sea-island structure is observed with a transmission electron microscope (TEM) in a visual field of 16.6 $\mu m^2$, and the number of island phases having a particle size of 0.2 $\mu m$ or more, preferably a particle size of 0.2 $\mu m$ or more and 2.0 $\mu m$ or less, is preferably 40 or more. The number of the island phases is preferably 40 or more and 200 or less, the lower limit is more preferably 50, and the upper limit is more preferably 100. When the number of the island phases having a particle size of 0.2 $\mu m$ or more falls in the above-described range, the impact strength is preferably excellent.

It is noted that a sea-island structure refers to a structure in which a discontinuous phase of a component constituting a particulate island phase having a closed interface (a boundary between phases) is present in a continuous phase of a component forming a sea phase. Besides, the particle size refers to a major axis of an island phase in a TEM image.

Besides, the island phase having a particle size of 0.2 $\mu m$ or more has a particle size of preferably 0.2 $\mu m$ or more and 10 $\mu m$ or less, more preferably 0.2 $\mu m$ or more and 5.0 $\mu m$ or less, further preferably 0.2 $\mu m$ or more and 2.0 $\mu m$ or less, particularly preferably 0.2 $\mu m$ or more and 1.0 $\mu m$ or less, and further particularly preferably 0.2 $\mu m$ or more and 0.8 $\mu m$ or less.

In the TEM observation, the sea-island structure can be easily found if a test piece is precedently dyed with osmium tetroxide. In the seal-island structure observed, the sea phase corresponds to a component of vinyl chloride-based resin (A), the island phase corresponds to a component of rubber-based impact absorber (B), and a component of modified olefin wax (C) is presumed to be present in the vicinity of the interface between the sea phase and the island phase.

In general, if a rubber-based impact absorber is used in a resin composition for purposes of improving the impact strength, it is regarded that the rubber-based impact absorber is preferably finely dispersed in the form of a particle having a small particle size. On the contrary, in the resin composition of the present invention, the rubber-based impact absorber is present in the form of a particle having a comparatively large particle size, but an unexpected effect of high impact strength can be obtained.

The reason is not clear, but is presumed as follows: Since the polarity of vinyl chloride-based resin (A) is strong, constraining force for the component of rubber-based impact absorber (B) is strong, and hence, if a dispersion particle size is small, the impact absorbing effect cannot be sufficiently exhibited. When the chlorine content of vinyl chloride-based resin (A) is high, the polarity becomes strong, and therefore, the above-described tendency is presumed to be remarkable particularly in a region where the chlorine content is high. On the contrary, in the resin composition of the present invention, rubber-based impact absorber (B) can form an island phase having a comparatively large particle size owing to the presence of modified olefin wax (C) containing at least one polar group selected from a halogen and a carboxylic acid derivative, and hence, even if the chlorine content of vinyl chloride-based resin (A) is increased, the impact absorbing effect of rubber-based impact absorber (B) is presumed to be more sufficiently exhibited.

6. Production Method for Resin Composition

The resin composition of the present invention can be produced by dry blending or melt blending by employing any of various optional methods. As a specific method, for example, a method in which vinyl chloride-based resin (A), rubber-based impact absorber (B), modified olefin wax (C) and another optional component are blended simultaneously or in an optional order by using a tumbler, a V-blender, a Nauta mixer, a banbury mixer, a kneading roll, a single or double screw extruder or the like is appropriately employed. Alternatively, vinyl chloride-based resin (A), rubber-based impact absorber (B), modified olefin wax (C) and another optional component may be blended by once dispersing or dissolving in an optional solvent, and drying the resultant by an appropriate method such as natural drying, or forced drying by heating.

B. Molded Article and Pipe

The molded article of the present invention contains the resin composition. The molded article of the present invention can be obtained by molding the resin composition into a desired shape by a known method, such as extrusion molding, compression molding, or injection molding. Examples of the molded article of the present invention include a pipe, a joint, a flat plate, a gutter, a sash, a siding, a sheet, a card, a cable connector component, and a molded article for a flange, and since the resin composition is excellent in the impact resistance and the heat resistance, it is preferably used for producing a pipe. Specific examples of application to a pipe include a pipe for a fire extinguishing sprinkler and a pipe for hot water supply.

EXAMPLES

The present invention will now be described in detail on the basis of examples, and it is noted that the present invention is not limited to these examples.

1. Vinyl Chloride-Based Resin (A)

As vinyl chloride-based resin (A), chlorinated vinyl chloride (chlorine content: 67 mass %, Vicat softening temperature: 120° C., deflection temperature under load: 107° C.) was used. It is noted that these physical properties were measured respectively under the following conditions:

<Chlorine Content>

The chlorine content was measured according to ISO 1158.

<Vicat Softening Temperature>

The Vicat softening temperature was measured according to ASTM D1525.

<Deflection Temperature Under Load>

The deflection temperature under load was measured according to ASTM D648.

2. Rubber-Based Impact Absorber (B)

Kane ace (trade name) B564 manufactured by Kaneka Corporation (MBS-based polymer, glass transition temperature: −80° C., MFR: 5.0 g/10 min, density: 950 kg/m$^3$) was used. It is noted that these physical properties were measured respectively under the following conditions:

<Glass Transition Temperature>

The glass transition temperature was measured with a differential scanning calorimeter (DSC).

The measurement method is as follows. A differential scanning calorimeter (X-DSC7000) manufactured by SII calibrated with an indium standard is used. A measurement sample is weighed into an aluminum DSC pan in an amount of about 10 mg. A lid is crimped on the pan to obtain a closed atmosphere, and thus, a sample pan is obtained. The sample pan is placed in a DSC cell, and an empty aluminum pan is placed as a reference. A temperature of the DSC cell is increased from 30° C. (room temperature) to 150° C. at a rate of 10° C./min under a nitrogen atmosphere (first temperature increase step). Next, the temperature is retained at 150° C. for 5 minutes, and then, is reduced at a rate of 10° C./min, so as to cool the DSC cell to −100° C. (temperature reduction step). A glass transition temperature (Tg) is defined as an intersection point between a tangent line on an inflection point of an enthalpy curve (i.e., a point on which a curve convex upward is changed to a curve convex downward) obtained through the temperature reduction step and an endothermic amount obtained when the temperature has been retained.

<MFR>

The MFR was measured according to ISO 1133 (temperature: 200° C., load: 5 kg).

<Density>

The density was measured according to JIS K7112 (density-gradient tube method).

3. Modified Olefin Wax (C)

As modified olefin wax (C), olefin waxes W1 to W8 shown in Table 1 were used. It is noted that olefin wax W6 is an unmodified wax. A method for producing each olefin wax will be described in an item of Production Example below.

<Softening Point>

The softening point was measured according to JIS K2207.

<Density>

The density was measured according to JIS K7112.

<Acid Value>

The acid value was measured according to JIS K5902. It is noted that an acid value of 11 mgKOH/g is converted into a content of a polar group of 1 mass %.

[Production Example 1] (Production of Olefin Wax W1)

1. Preparation of Catalyst

In a glass autoclave having an internal volume of 1.5 liters, 25 g of commercially available anhydrous magnesium chloride was suspended in 500 ml of hexane. The resultant was retained at 30° C., and 92 ml of ethanol was added thereto in a dropwise manner over 1 hour under stirring, and the resultant was further reacted for another 1 hour. After completing the reaction, 93 ml of diethylaluminum monochloride was added thereto in a dropwise manner over 1 hour, and the resultant was reacted for another 1 hour. After completing the reaction, 90 ml of titanium tetrachloride was added thereto in a dropwise manner, and the temperature of the reaction vessel was increased up to 80° C. for performing a reaction for 1 hour. After completing the reaction, a solid

TABLE 1

| | W1 | W2 | W3 | W4 | W5 | W6 | W7 | W8 |
|---|---|---|---|---|---|---|---|---|
| Modification | Acid-modification | Acid-modification | Oxidation | Oxidation | Styrene-modification | Unmodified | Acid-modification | Acid-modification |
| Synthesis method | Ziegler | Thermal decomposition | Ziegler | Ziegler | Ziegler | Ziegler | Metallocene | Metallocene |
| Composition    C2 (mol %) | 96 | 3 | 97 | 97 | 96 | 100 | 100 | 100 |
|                C3 (mol %) | 4 | 97 | 3 | 3 | 4 | 0 | 0 | 0 |
| Mn (in terms of PS) | 1700 | 9000 | 2500 | 2300 | 2000 | 1200 | 1220 | 1240 |
| Softening point (° C.) | 110 | 140 | 110 | 110 | 110 | 110 | 113 | 110 |
| Density (kg/m$^3$) | 920 | 920 | 950 | 920 | 1000 | 920 | 960 | 980 |
| Mw/Mn | 2.4 | 4.4 | 5.2 | 3.0 | 2.6 | 2.0 | 2.2 | 2.3 |
| Acid value (mgKOH/g) | 60 | 45 | 17 | 1 | 0 | 0 | 50 | 100 |

<Composition of Polymer>

Contents of a structural unit derived from ethylene and a structural unit derived from an α-olefin having 3 to 4 carbon atoms in modified olefin wax (C) were obtained by the analysis of a $^{13}$C-NMR spectrum. It is noted that C2 and C3 in Table 1 are used to respectively mean ethylene and propylene.

<Mn and Mw/Mn>

The number average molecular weight Mn and a molecular weight distribution (Mw/Mn) of modified olefin wax (C) were obtained based on GPC measurement. The measurement was performed under the following conditions. Besides, the number average molecular weight Mn and the weight average molecular weight Mw were obtained by creating a calibration curve using commercially available monodisperse standard polystyrene.

Apparatus: gel permeation chromatograph, Alliance GPC 2000 (manufactured by Waters)
Solvent: o-dichlorobenzene
Column: TSKgel GMH6-HT×2 and TSKgel GMH6-HTL×2 columns (both manufactured by Tosoh Corporation)
Flow rate: 1.0 ml/min
Sample: 0.15 mg/mL o-dichlorobenzene solution
Temperature: 140° C.

portion was washed with hexane by decantation until free titanium could not be detected. The resultant was obtained as a hexane suspension, whose titanium concentration was quantitatively determined by titration, so as to be used in an experiment described below.

2. Production of Ethylene/Propylene Copolymer (Unmodified Olefin Wax c1)

A sufficiently nitrogen-substituted autoclave of stainless steel having an internal volume of 2 liters was charged with 930 ml of hexane and 70 ml of propylene, and hydrogen was introduced thereinto to obtain a pressure of 20.0 kg/cm$^2$ (gauge pressure). Subsequently, after the temperature within the system was increased to 170° C., 0.1 mmol of triethylaluminum, 0.4 mmol of ethylaluminum sesquichloride, and the hexane suspension of the solid obtained as described above were injected thereinto with ethylene so that the amount of a titanium component could be 0.008 mmol in terms of atoms, and thus polymerization was started.

Thereafter, merely ethylene was continuously supplied to retain a total pressure at 40 kg/cm$^2$ (gauge pressure), and the polymerization was performed at 170° C. for 40 minutes.

After stopping the polymerization by adding a small amount of ethanol to the system, unreacted portions of ethylene and propylene were purged. The thus obtained polymer solution was dried overnight at 100° C. under reduced pressure to obtain an ethylene/propylene copolymer.

3. Acid Modification 500 g of unmodified olefin wax (c1) was charged into a glass reactor, and was melted at 160° C. under a nitrogen atmosphere. Subsequently, 30 g of maleic anhydride and 3 g of di-t-butyl peroxide (hereinafter abbreviated as DTBPO) were continuously supplied to the reaction system (temperature: 160° C.) over 5 hours. Thereafter, the resultant was reacted by heating for another 1 hour, the resultant was deaerated in a melted state under 10 mmHg vacuum for 0.5 hours to remove a volatile component, and the resultant was cooled to obtain olefin wax W1. Physical properties thereof are shown in Table 1.

[Production Example 2] (Production of Olefin Wax W2)

A commercially available propylene/ethylene copolymer was thermally decomposed to obtain unmodified olefin wax (c2).

Unmodified olefin wax (c2) was subjected the acid modification under the same conditions as olefin wax W1 to obtain olefin wax W2. Physical properties thereof are shown in Table 1.

[Production Example 3] (Production of Olefin Wax W3)

Unmodified olefin was (c3) was obtained by adjusting the amounts of propylene and hydrogen to be charged in Production Example 1.

500 g of unmodified olefin wax (c3) was charged into a glass reactor, and was melted at 160° C. under a nitrogen atmosphere. Subsequently, 1 L/min of dry air was continuously supplied over 2 hours. Thereafter, the resultant was reacted by heating for another 1 hour, and was deaerated in a melted state under 10 mmHg vacuum for 0.5 hours to remove a volatile component, and then the resultant was cooled to obtain olefin wax W3. Physical properties thereof are shown in Table 1.

[Production Example 4] (Production of Olefin Wax W4)

Unmodified olefin was (c4) was obtained by adjusting the amounts of propylene and hydrogen to be charged in Production Example 1.

500 g of unmodified olefin wax (c4) was charged into a glass reactor, and was melted at 160° C. under a nitrogen atmosphere. Subsequently, 1 L/min of dry air was continuously supplied over 0.5 hours. Thereafter, the resultant was reacted by heating for another 1 hour, and was deaerated in a melted state under 10 mmHg vacuum for 0.5 hours to remove a volatile component, and then the resultant was cooled to obtain olefin wax W4. Physical properties thereof are shown in Table 1.

[Production Example 5] (Production of Olefin Wax W5)

Unmodified olefin was (c5) was obtained by adjusting the amounts of propylene and hydrogen to be charged in Production Example 1.

500 g of unmodified olefin wax (c5) was charged into a glass reactor, and was melted at 160° C. under a nitrogen atmosphere. Subsequently, 30 g of styrene and 3 g of di-t-butyl peroxide (hereinafter abbreviated as DTBPO) were continuously supplied to the reaction system (temperature: 160° C.) over 5 hours. Thereafter, the resultant was reacted by heating for another 1 hour, and was deaerated in a melted state under 10 mmHg vacuum for 0.5 hours to remove a volatile component, and then the resultant was cooled to obtain olefin wax W5. Physical properties thereof are shown in Table 1.

[Production Example 6] (Production of Olefin Wax W6)

Unmodified olefin wax W6 was obtained by homopolymerization of ethylene without using propylene in the production step of unmodified olefin wax c1 of Production Example 1.

[Production Example 7] (Production of Olefin Wax W7)

Through a supply port of a sufficiently nitrogen-substituted continuous pressure polymerization reactor equipped with an impeller having a volume of 33 L, dehydration purified n-hexane, triisobutyl aluminum, N,N-dimethylanilinium tetrakis(pentafluorophenyl)borate, and bis(n-butylcyclopentadienyl)zirconium dimethyl were supplied respectively at rates of 24 L/hr, 1.0 mmol/hr, 0.03 mmol/hr, and 0.01 mmol/hr. Simultaneously, through another supply port of the polymerization reactor, ethylene and hydrogen were supplied respectively at rates of 5.5 kg/hr and 480 NL/hr, and continuous solution polymerization was carried out under conditions of a polymerization temperature of 150° C., a total pressure of 3.0 to 3.2 MPaG, and a retention time of 50 minutes.

An oligomer solution thus generated in the polymerization reactor was continuously discharged to be sent to a flash tank, in which unreacted portions of ethylene and n-hexane were devolatilized. The resultant was subjected to thin film evaporation at 210° C. under reduced pressure (43 Pa) at a treatment rate of 6 g per minute. This operation was repeated until a necessary amount could be obtained, and thus, olefin wax W7 was obtained.

[Production Example 8] (Production of Olefin Wax W8)

Olefin wax W8 was obtained by adjusting amounts of ethylene and hydrogen to be charged in Production Example 7.

Examples 1 to 7 and Comparative Examples 1 to 10

(Preparation of Resin Composition)

100 parts by mass of vinyl chloride-based resin (A) (chlorinated vinyl chloride), 6 to 12 parts by mass of rubber-based impact absorber (B) (MBS), 1 to 4 parts by mass of any of various waxes, and 3 parts by mass of AT-1000 (mercapto tin-based stabilizer) manufactured by Nitto Kasei Co., Ltd. used as a stabilizer were charged into a plastic bag at a time for dry blending. It is noted that no wax was blended in Comparative Example 1. Blending ratios are shown in Tables 2 to 4 below.

A two roll mill (DY6-15, roll clearance: 0.7 mm) heated to 180° C. was used to knead 200 g of each of the thus obtained resin compositions over 5 minutes. Thereafter, the resin composition taken out in the shape of a sheet was compression molded into a plate shape having a size of 200 mm×200 mm×T 3 mm using a hot press (70 ton press, set temperature: 195° C., preheating time: 5 minutes, pressing time: 40 seconds, pressure: 15 MPa) and a cool press (30 ton press, cooling time: 2 minutes, pressure 15 MPa). An IZOD impact test piece (having a notch) was created by cutting.

(Evaluation of Resin Composition)

The processability, the heat resistance, the impact resistance, and the rubber dispersibility of each of the obtained resin compositions were evaluated as follows. The results are shown in Tables 2 to 4.

<Processability>

The resin composition was supplied to a two roll mill over about 1 minute, and easiness in wrapping the resin composition around the two rolls was visually checked and evaluated as follows:

A: The resin composition easily wraps around the rolls without dropping off therefrom.

B: The resin composition slightly drops off from the rolls, but a dropped portion wraps around the rolls when supplied thereto again.

C: The resin composition drops off from the rolls, and a dropped portion cannot wrap around the rolls even when supplied thereto again.

<Heat Resistance>

A degree of coloring caused after the resin composition was kneaded for 5 minutes using the two roll mill was visually checked and evaluated as follows:

A: The resin composition is little yellowed as compared with its color immediately after starting the kneading.

B: The resin composition is rather yellowed as compared with its color immediately after starting the kneading.

C: The resin composition is severely yellowed as compared with its color immediately after starting the kneading.

<Impact Resistance>

IZOD impact strength was measured according to ASTM D256 (method A).

<Rubber Dispersibility>

An IZOD test piece was cut into an ultrathin section and dyed with osmium tetroxide. Thereafter, a sea-island structure was observed with a transmission electron microscope (TEM), and the number of island-phases having a particle size of 0.2 μm or more was counted in a visual field of 16.6 μm$^2$, and evaluated as follows:

A: The number is 50 to 70.

B: The number is 40 to 50.

C: The number is less than 40.

Figure 2:
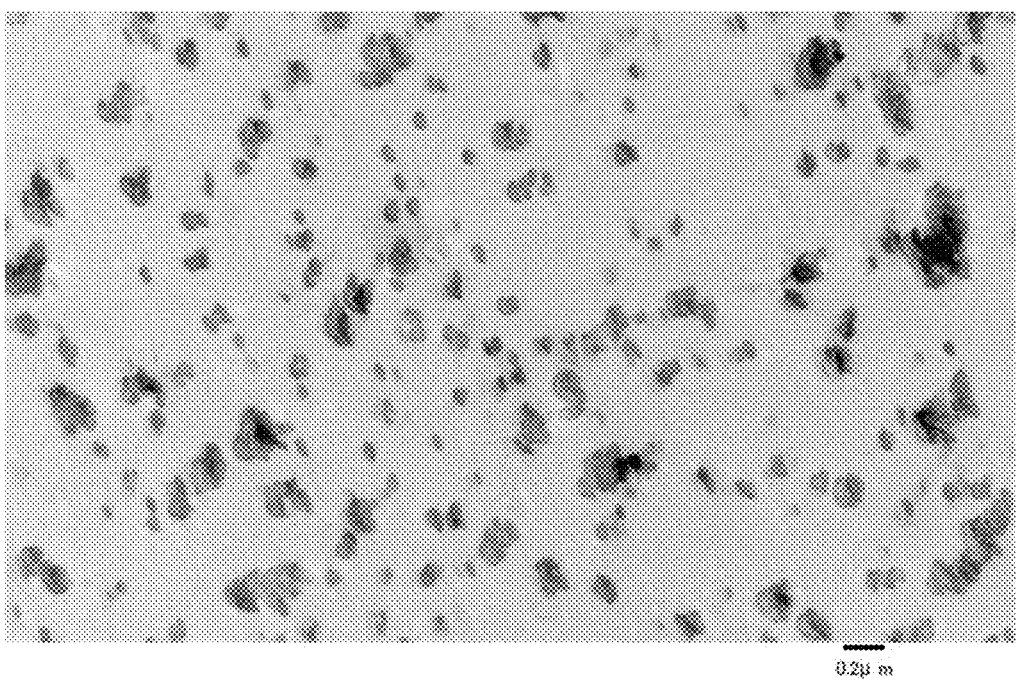
FIG. 2 illustrates observation, with a transmission electron microscope, of a resin composition of Example 5.
Figure 3:
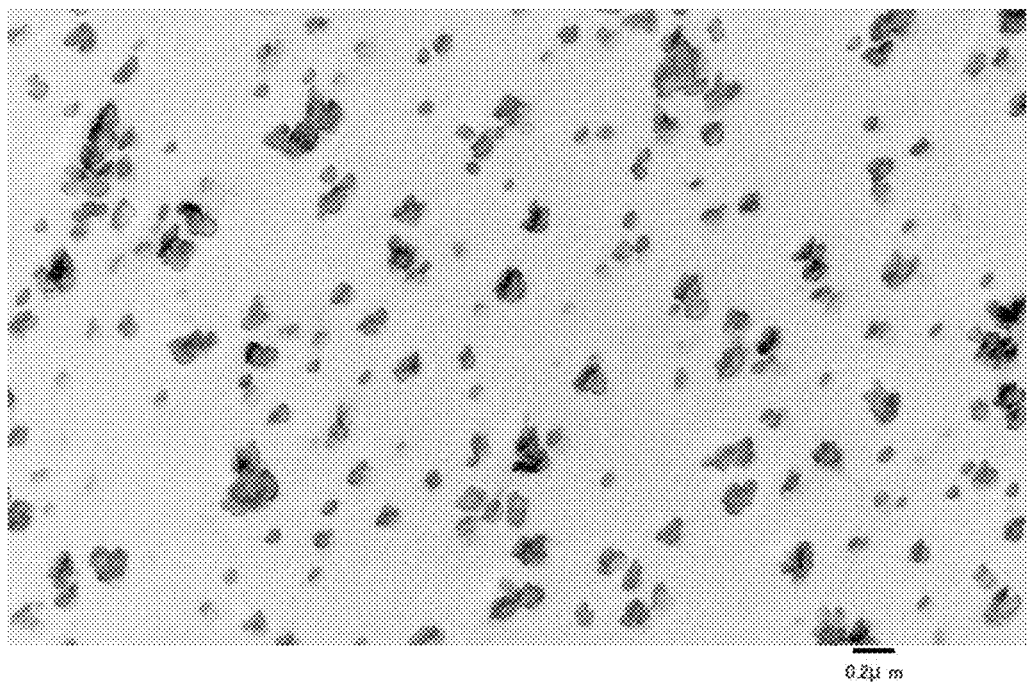
FIG. 3 illustrates observation, with a transmission electron microscope, of a resin composition of Comparative Example 1.

TEM observation images of Example 1, Example 5 and Comparative Example 1 are respectively illustrated in FIGS. 1 to 3.

TABLE 2

|  |  |  | Unit | Example 1 | Example 2 | Example 3 | Example 4 | Example 5 | Example 6 | Example 7 |
|---|---|---|---|---|---|---|---|---|---|---|
| Resin composition | Vinyl chloride-based resin (A) |  | Parts by mass | 100 | 100 | 100 | 100 | 100 | 100 | 100 |
|  | Rubber-based impact absorber (B) |  | Parts by mass | 6 | 12 | 6 | 6 | 6 | 6 | 6 |
|  | Wax (C) | W1 | Parts by mass | 2 | 2 | 4 |  |  |  |  |
|  |  | W2 | Parts by mass |  |  |  |  | 2 |  |  |
|  |  | W3 | Parts by mass |  |  |  |  |  | 2 |  |
|  |  | W4 | Parts by mass |  |  |  |  |  |  |  |
|  |  | W5 | Parts by mass |  |  |  |  |  |  |  |
|  |  | W6 | Parts by mass |  |  |  |  |  |  |  |
|  |  | W7 | Parts by mass |  |  |  |  |  |  | 2 |
|  |  | W8 | Parts by mass |  |  |  |  |  |  | 2 |
| Evaluation | Impact resistance (IZOD impact strength) |  | J/m | 200 | 250 | 180 | 220 | 160 | 190 | 170 |
|  | Processability |  | — | A | A | B | A | A | A | A |
|  | Heat resistance |  |  | A | B | A | A | A | A | A |
|  | Rubber dispersibility |  | — | A | A | A | A | B | A | B |

TABLE 3

|  |  |  | Unit | Comparative example 1 | Comparative example 2 | Comparative example 3 | Comparative example 4 | Comparative example 5 |
|---|---|---|---|---|---|---|---|---|
| Resin composition | Vinyl chloride-based resin (A) |  | Parts by mass | 100 | 100 | 100 | 100 | 100 |
|  | Rubber-based impact absorber (B) |  | Parts by mass | 6 | 6 | 0.5 | 2 | 2 |
|  | Wax (C) | W1 | Parts by mass |  |  | 1 | 1 | 2 |
|  |  | W2 | Parts by mass |  |  |  |  |  |
|  |  | W3 | Parts by mass |  |  |  |  |  |
|  |  | W4 | Parts by mass |  | 2 |  |  |  |
|  |  | W5 | Parts by mass |  |  |  |  |  |
|  |  | W6 | Parts by mass |  |  |  |  |  |
|  |  | W7 | Parts by mass |  |  |  |  |  |
|  |  | W8 | Parts by mass |  |  |  |  |  |
| Evaluation | Impact resistance (IZOD impact strength) |  | J/m | 80 | 140 | 30 | 40 | 50 |
|  | Processability |  | — | C | B | A | A | A |
|  | Heat resistance |  | — | A | A | B | B | A |
|  | Rubber dispersibility |  | — | C | C | C | C | C |

TABLE 4

|  |  |  | Unit | Comparative example 6 | Comparative example 7 | Comparative example 8 | Comparative example 9 | Comparative example 10 |
|---|---|---|---|---|---|---|---|---|
| Resin composition | Vinyl chloride-based resin (A) |  | Parts by mass | 100 | 100 | 100 | 100 | 100 |
|  | Rubber-based impact absorber (B) |  | Parts by mass | 20 | 6 | 6 | 6 | 6 |
|  | Wax (C) | W1 | Parts by mass | 2 | 12 |  |  |  |
|  |  | W2 | Parts by mass |  |  |  |  |  |
|  |  | W3 | Parts by mass |  |  |  |  |  |
|  |  | W4 | Parts by mass |  |  |  | 1 |  |
|  |  | W5 | Parts by mass |  |  |  |  | 2 |
|  |  | W6 | Parts by mass |  |  |  |  | 2 |
|  |  | W7 | Parts by mass |  |  |  |  |  |
|  |  | W8 | Parts by mass |  |  |  |  |  |
| Evaluation | Impact resistance (IZOD impact strength) |  | J/m | 100 | — | 110 | 130 | 140 |
|  | Processability |  | — | B | C | A | A | C |
|  | Heat resistance |  | — | C | — | A | A | A |
|  | Rubber dispersibility |  | — | A | — | C | C | B |

In the resin composition of each of Examples 1 to 7 containing 3 to 15 parts by mass of rubber-based impact absorber (B) and 0.1 to 10 parts by mass of modified olefin wax (C) with respect to 100 parts by mass of vinyl chloride-based resin (A), the impact resistance, the processability and the heat resistance were sufficiently high, and the rubber was dispersed in the form of a particle having a comparatively large particle size.

In Comparative Example 1 not containing modified olefin wax (C), the impact resistance was insufficient. This is probably because rubber-based impact absorber (B) was dispersed in the form of a particle having a small particle size, and hence the number of particles present therein in the form of a particle having a comparatively large particle size is insufficient.

Besides, in Comparative Example 2 and Comparative Example 8 in which modified olefin wax (C) contained a polar group in an amount less than 0.1 mass %, the impact resistance was insufficient. This is probably because rubber-based impact absorber (B) was not dispersed in the form of a particle having a comparatively large particle size.

Furthermore, in Comparative Examples 3 to 5 in which the content of rubber-based impact absorber (B) was less than 3 parts by mass with respect to 100 parts by mass of vinyl chloride-based resin (A), the impact resistance was insufficient. This is probably because the amount of rubber-based impact absorber (B) was so small that the effect to absorb impact did not sufficiently work.

In Comparative Example 6 in which the content of rubber-based impact absorber (B) was higher than 15 parts by mass with respect to 100 parts by mass of vinyl chloride-based resin (A), the heat resistance was insufficient. This is probably because coloring through thermal degradation occurred due to an intramolecular unsaturated bond contained in rubber-based impact absorber (B).

In Comparative Example 7 in which the content of modified olefin wax (C) was higher than 10 parts by mass with respect to 100 parts by mass of vinyl chloride-based resin (A), the resin composition did not wrap around the two rolls, and was not suitable for practical use due to the insufficient processability. This is probably because modified olefin wax (C) having a low molecular weight and low polarity formed a lubricating film with low viscosity on the surface of the resin composition.

In Comparative Example 9 in which the olefin wax was modified with a substance except for a halogen and a carboxylic acid derivative, the impact resistance was insufficient. This is probably because rubber-based impact absorber (B) was not dispersed in the form of a particle having a comparatively large particle size.

In Comparative Example 10 in which the olefin was not modified with a polar group, the impact resistance and the processability were insufficient. This is probably because rubber-based impact absorber (B) was not dispersed in the form of a particle having a comparatively large particle size.

The present application is based upon and claims the benefit of priority of the prior Japanese Patent Application No. 2015-205675, filed on Oct. 19, 2015, the entire contents of which are incorporated herein by reference.

INDUSTRIAL APPLICABILITY

The resin composition of the present invention is excellent in balance among impact resistance, processability and heat resistance. The resin composition of the present invention can be suitable for application as a pipe or the like, in particular.

The invention claimed is:

1. A resin composition, comprising 3 to 15 parts by mass of rubber-based impact absorber (B) and 0.1 to 10 parts by mass of modified olefin wax (C) with respect to 100 parts by mass of vinyl chloride-based resin (A), and satisfying the following requirements (I) to (III):
   (I) the vinyl chloride-based resin (A) has a chlorine content of 55 to 75 mass %;
   (II) the rubber-based impact absorber (B) has a glass transition temperature (Tg), measured by differential scanning calorimetry (DSC), of 0° C. or less; and
   (III) the modified olefin wax (C) contains at least one polar group selected from a halogen and a carboxylic acid derivative, a content of the polar group being in a range of 0.1 to 50 mass %.

2. The resin composition according to claim 1, wherein the chlorine content in the vinyl chloride-based resin (A) is 60 to 75 mass % in the requirement (I).

3. The resin composition according to claim 1, wherein the rubber-based impact absorber (B) contains a rubber component selected from a butadiene rubber, an acrylic rubber and a silicone rubber.

4. The resin composition according to claim 1, wherein the modified olefin wax (C) is a product obtained by introducing a polar group into a homopolymer obtained from one selected from ethylene and α-olefins having 3 to 12 carbon atoms, or a copolymer obtained from two or more selected from ethylene and α-olefins having 3 to 12 carbon atoms.

5. The resin composition according to claim 1, wherein the modified olefin wax (C) satisfies the following requirements (i) to (iv):
- (i) a number average molecular weight (Mn) measured by gel permeation chromatography (GPC) in terms of polystyrene is in a range of 300 to 20,000;
- (ii) a softening point measured according to JIS K2207 is in a range of 70 to 170° C.;
- (iii) a density measured by a density-gradient tube method is in a range of 830 to 1,200 kg/m$^3$; and
- (iv) an acid value is 10 to 200 mgKOH/g.

6. The resin composition according to claim 1, wherein the modified olefin was (C) is a carboxylic acid-modified product of an unmodified olefin wax (c), or an oxide of the unmodified olefin wax (c).

7. The resin composition according to claim 1, wherein the modified olefin wax (C) is a maleic anhydride-modified product of an unmodified olefin wax (c).

8. The resin composition according to claim 1, wherein a sea-island structure is observed with a transmission electron microscope (TEM) in a visual field of 16.6 μm$^2$, and the number of island phases having a particle size of 0.2 μm or more is 40 or more.

9. The resin composition according to claim 1, wherein a sea-island structure is observed with a transmission electron microscope (TEM) in a visual field of 16.6 μm$^2$, and the number of island phases having a particle size of 0.2 μm or more and 2.0 μm or less is 40 or more.

10. A molded article, comprising the resin composition according to claim 1.

11. A pipe, comprising the resin composition according to claim 1.

* * * * *